United States Patent
Zheng

(10) Patent No.: US 7,558,283 B2
(45) Date of Patent: Jul. 7, 2009

(54) METHOD, APPARATUS AND COMPUTER PROGRAM PRODUCT PROVIDING QUALITY OF SERVICE SUPPORT IN A WIRELESS COMMUNICATIONS SYSTEM

(75) Inventor: Haihong Zheng, Coppell, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/071,492

(22) Filed: Mar. 2, 2005

(65) Prior Publication Data

US 2005/0201324 A1 Sep. 15, 2005

Related U.S. Application Data

(60) Provisional application No. 60/552,466, filed on Mar. 12, 2004.

(51) Int. Cl.
*H04J 3/16* (2006.01)
(52) U.S. Cl. .................. 370/437; 370/341; 370/235
(58) Field of Classification Search ............ 370/235, 370/310, 312, 328, 329, 338, 341, 347, 348, 370/349, 347–49, 352, 356, 395.5, 395.52, 370/401, 406, 437, 469, 522, 524; 709/225–232, 709/238, 246; 455/426.1, 450, 452.2, 509, 455/561
See application file for complete search history.

(56) References Cited

U.S. PATENT DOCUMENTS

| | | | | |
|---|---|---|---|---|
| 6,728,365 B1 * | 4/2004 | Li et al. | ........... | 379/329 |
| 6,980,523 B1 * | 12/2005 | Lipford et al. | ........... | 370/252 |
| 7,031,287 B1 * | 4/2006 | Ho et al. | ........... | 370/338 |
| 7,039,039 B2 * | 5/2006 | Cheong et al. | ........... | 370/349 |
| 7,061,880 B2 * | 6/2006 | Basilier | ........... | 370/312 |
| 7,254,119 B2 * | 8/2007 | Jiang et al. | ........... | 370/328 |
| 7,272,379 B1 * | 9/2007 | Tang et al. | ........... | 455/406 |
| 7,280,505 B2 | 10/2007 | Chaskar et al. | ........... | 370/331 |
| 7,400,596 B1 * | 7/2008 | Robertson et al. | ........... | 370/312 |

OTHER PUBLICATIONS

CDMA2000 Wireless IP Network Standard: Packet Data Mobility and Resource Management, Aug. 2003, 3GPP2 X.S0011-003-C, Version 1.0.0, pp. 12-14.*
Interoperability Specification (IOS) for CDMA2000 Access Network Interfaces—Part 1 Overview, Nov. 16, 2001, 3GPP2 A.S0011-0, Version 1.0, p. 19.*
"3GPP2 cdma2000 Wireless IP Network Standard: Packet Data Mobility and Resource Management", Version 1.0.0, Aug. 2003, pp. 1-24.
"3GPP2 Interoperability specification (IOS) for cdma2000 Access Network Interfaces—Part 4 (A1, A2, and A5 Interfaces) (3G-IOSv4.3.1)", Version 1.0, Apr. 2004, pp. 1-410.

* cited by examiner

*Primary Examiner*—Wing F Chan
*Assistant Examiner*—Mark A Mais
(74) *Attorney, Agent, or Firm*—Harrington & Smith, PC

(57) ABSTRACT

Disclosed herein are a method, apparatus and computer program product to correlate service instance for a mobile station (MS), radio access network (RAN) and a packet data serving node (PDSN) connection by exchanging identifiers between the entities involved in the connections. Also disclosed herein are a method, apparatus and computer program product to perform a handoff of a Mobile Node (MN) from a first Packet Data Serving Node (PDSN) associated with a first Radio Network (RN) to a second PDSN, associated with a second RN. As a non-limiting example, the method includes sending a handoff request message from the first RN to the second RN, and communicating between the second RN to the second PDSN and between the second PDSN and the first PDSN to accomplish the handoff; where Quality of Service (QoS) information associated with the MN in the first RN is sent to the second PDSN.

15 Claims, 9 Drawing Sheets

METHOD, APPARATUS AND COMPUTER PROGRAM PRODUCT PROVIDING QUALITY OF SERVICE SUPPORT IN A WIRELESS COMMUNICATIONS SYSTEM

CLAIM OF PRIORITY FROM COPENDING PROVISIONAL PATENT APPLICATION

This patent application claims priority under 35 U.S.C. §119(e) from Provisional Patent Application Ser. No. 60/552,466, filed Mar. 3, 2004, the disclosure of which is incorporated by reference herein in its entirety.

TECHNICAL FIELD

The presently preferred embodiments of this invention relate generally to communication systems and, more particularly, to Quality of Service (QoS) correlation between entities in a communication system. The presently preferred embodiments of this invention further relate generally to packet data mode hand off techniques for use in a radio network (RN) that services a mobile station (MS), also referred to herein as a Mobile Node (MN), and, more specifically, relate to such handoff techniques that accommodate a certain MN QoS during and after the handoff.

BACKGROUND

The subject matter of this patent application is at least partially in support of a proposal to 3GPP2 TSG Core Networks (TSG-X) Packet Data Serving (PDS) work group (WG). However, the application is not to be deemed limited to such specifications which may be published by such body as 3GPP2.

The following aspects regarding an end-to-end (E2E) QoS solution have been previously agreed in the PDS WG: the use of enhanced flow mapping/treatment protocol for QoS signaling from the Mobile Station (MS) to the Packet Data Serving Node (PDSN); provide a capability in the Packet Data Serving Node (PDSN) to request a Radio Access Network (RAN)-PDSN (R-P) connection with specific QoS parameters; and adopt an approach that the MS send QoS Requirements to the PDSN, and that the PDSN send the MS QoS requirement to the RAN.

FIG. 1A is a session diagram 100 showing a conventional QoS negotiation procedure in a cdma2000-type network. Network entities involved during the session include, but are not limited to, the Mobile Station (MS) 110, Radio Access Network (RAN) 120 and Packet Data Serving Node (PDSN) 130.

At step 101, after exchanging the application level information (not shown in the diagram), the MS 110 sends a 3GPP2-RSVP Resv message to the PDSN 130 containing QoS attributes and traffic filter templates (TFTs) in the 3GPP2 object for both the receiver and the sender.

Step 102, after successful authorization of the requested QoS attributes, the PDSN 130 processes the request, extracts the radio-related QoS parameters and generates the cdma2000 Bearer Service QoS parameters. The PDSN 130 requests the RAN 120 to establish a bearer with the appropriate QoS parameters (link level QoS).

The RAN 120 acknowledges the session update message at step 103. Then at step 104, the RAN 120 uses its resource management to determine if it can honor the request, and requests establishment of a Service instance to the MS 110 with the granted link level QoS and assigned Service Reference Identifier (SR_ID).

At step 105, the MS 110 accepts the request and at step 106 the RAN 120 sends an R-P setup message to the PDSN 130. The message may contain actual granted QoS parameters, e.g., if the requested QoS parameters could not be honored by the RAN 120 (to be used for accounting purposes).

At step 107, the PDSN 130 acknowledges the R-P setup message and sends the ResvConf message to the MS 110 at step 108.

It has been found that the above described signaling approach has collocation problems between the procedures performed over the different interfaces.

More specifically, a problem that arises with the conventional QoS signaling approach is that since the SR_ID is only assigned during the auxiliary service instance setup procedure (step 104), the MS 110 cannot correlate the higher layer QoS signaling (i.e., the RESV signaling) with the service instance just established at step 104 and 105. In other words, the MS 110 accepts an auxiliary Service Instance (SI) establishment request without knowing for which application the SI is established. The correlation is only established in the MS 110 after step 108. This procedure may violate the design concept that the MS 110 should know which service instance is established for which application.

Another problem with the conventional QoS signaling approach is that when the R-P update message is sent by the PDSN 130 in step 102 to check the resource availability, no SR_ID is assigned. Therefore, when the PDSN 130 later receives the R-P setup request message in step 106 from the RAN 120, the PDSN 130 cannot correlate the R-P update message and the R-P setup request message, and thus, cannot correlate the RESV message (step 101) with the R-P setup request message (step 106). As a result, the PDSN 130 does not know whether the SR_ID carried in the R-P setup request message is for the TFT carried in RESV message. As a result, the PDSN 130 does not send a RESV_CONF response to MS 110 with the assigned SR_ID.

As is described in 3GPP2 specification (Packet Data Mobility and Resource Management-X.S0011-003-C), when a Mobile Node (MN) with an active service instance hands off to a new Packet Data Serving Node (PDSN), a fast hand off procedure may be supported between the PDSNs. On detection of a condition where a handoff is required, a source Radio Network (RN), sometimes referred to as a Radio Access Network (RAN), initiates hand off procedures with the target RN (via a Mobile Switching Center (MSC)). The target RN selects a target PDSN and establishes one R-P connection for each service instance to that target PDSN. For each R-P connection so established, the target PDSN attempts to establish a P-P connection to the source PDSN. The source PDSN applies all existing link layer contexts (e.g., Point-to-Point Protocol (PPP) and compression) before sending the data packets to the target PDSN over the P-P connection. A high level message flow diagram for this type of inter-PDSN handoff is shown in FIG. 1B, where Src represents "Source" and Tgt represents "Target".

As is explained in further detail below, this conventional inter-PDSN handoff technique does not consider how to provide QoS over the R-P network, and the external network, during and after handoff. The QoS requested by a MN may include a specific data rate and error rate, and in general may specify a certain data throughput based on an application of interest. For example, the MN may request a different QoS when engaged in a Voice over Internet Protocol (VoIP) application (e.g., one having low latency) than when involved in a typical web browsing application or a streaming video download application.

More specifically, when using the conventional fast PDSN handoff procedure, and after the P-P connection is established, the target PDSN does not have knowledge of the MN QoS requirements, or of the QoS policy to be applied to the service instance. As a result of this deficiency, no Internet Protocol (IP) QoS can be supported over the R-P network between target RN and target PDSN, as well as over network between source PDSN and target PDSN for the packet traffic transferred in the reverse direction.

It is noted that in current practice of particular interest to the preferred embodiments of this invention the Handoff Request message sent from the Src RN to the Tgt RN can carry one QoS-related parameter: "Non-Assured Mode Packet Priority", which indicates the priority of a non-assured packet data service as specified in 3GPP2 A.S0014-B, v. 1.0, Section 4.2.41. However, the information conveyed by this field is insufficient for the Tgt PDSN to derive a QoS policy for the MN.

SUMMARY OF THE PREFERRED EMBODIMENTS

The foregoing and other problems are overcome, and other advantages are realized, in accordance with the presently preferred embodiments of this invention.

A system according to an embodiment of this invention provides a method for correlating service instance for a MS, a RAN and a PDSN connection by exchanging identifiers between the entities involved in the connections.

In a first aspect thereof this invention provides a method for correlating service instance for a mobile station (MS), radio access network (RAN) and a packet data serving node (PDSN) connection. The method comprises receiving from a mobile station a 3GPP2-RSVP Resv message, the message comprising a request for a plurality of quality of service attributes and a plurality of traffic filter templates; receiving a Request Identifier generated by the mobile station; processing the requested plurality of quality of service attributes; extracting from the plurality of quality of service attributes at least one attribute related to radio access; generating a plurality of bearer service parameters; requesting the radio access network to establish a bearer based on the plurality of bearer service parameters; providing the Request Identifier to the radio access network; receiving acknowledgment from the radio access network; receiving a setup message comprising a plurality of quality of service attributes granted by the radio access network and a service reference identifier; correlating the connection with the radio access network and sending a confirmation message to the mobile station, the confirmation message comprising the plurality of quality of service attributes granted by the radio access network, the service reference identifier and the Request Identifier.

In a second aspect thereof this invention provides a method for correlating service instance for a mobile station (MS), radio access network (RAN) and a packet data serving node (PDSN) connection, where the method includes receiving from a mobile station a reservation message, the reservation message comprising a request for a plurality of quality of service attributes and a plurality of traffic filter templates; processing the requested plurality of quality of service attributes; extracting from the plurality of quality of service attributes at least one attribute related to radio access; generating a plurality of bearer service parameters; requesting the radio access network to establish a bearer based on the plurality of bearer service parameters; providing a connection identifier; receiving acknowledgment from the radio access network having a connection identifier; receiving a setup message comprising a plurality of quality of service attributes granted by the radio access network and a service reference identifier; correlating the connection with the radio access network and sending a confirmation message to the mobile station, the confirmation message comprising the plurality of quality of service attributes granted by the radio access network, and the service reference identifier.

In a third aspect thereof this invention provides a method for correlating service instance for a mobile station (MS), radio access network (RAN) and a packet data serving node (PDSN) connection, where the method includes receiving a reservation request message at the PDSN from the MS comprising a plurality of quality of service (QoS) attributes and a Request Identifier generated by the MS; processing the requested plurality of quality of service attributes and generating therefrom a plurality of bearer service QoS parameters; sending a request to the RAN to establish a bearer based at least in part on the plurality of bearer service QoS parameters, the request to establish a bearer comprising the Request Identifier; sending a service instance setup message to the MS from the RAN, the service instance setup message comprising link-level QoS parameters granted by the RAN and the Request Identifier; sending a RAN-PDSN connection setup request message from the RAN to the PDSN, the setup request message comprising the Request Identifier; correlating at the PDSN the RAN-PDSN connection with the Request Identifier received from the MS in the reservation request message and sending a reservation confirmation message to the MS, the reservation confirmation message comprising the Request Identifier.

In a further aspect of this invention there is provided a MS operable with a RAN and a PDSN, where the MS includes means for sending a flow request message to the PDSN comprising information specifying a desired quality of service (QoS) for the flow and a Flow Request Identifier generated by the MS for identifying the flow request; and means for receiving from the RAN information specifying at least granted QoS parameters and the Flow Request Identifier, and for further receiving a flow request confirmation message from the PDSN, the flow request confirmation message also comprising the Flow Request Identifier.

In a still further aspect thereof this invention provides a method to operate a MS with a RAN and a PDSN, comprising sending a flow request message to the PDSN comprising information specifying a desired quality of service (QoS) for the flow and a Flow Request Identifier generated by the MS for identifying the flow request; receiving from the RAN information specifying at least granted QoS parameters and the Flow Request Identifier and receiving a flow request confirmation message from the PDSN, the flow request confirmation message also comprising the Flow Request Identifier.

In another aspect thereof this invention provides a computer program product tangibly embodied on a computer readable medium that includes program instructions the execution of which operate a MS with a RAN and a PDSN, comprising operations of sending a flow request message to the PDSN comprising information specifying a desired quality of service (QoS) for the flow and a Flow Request Identifier generated by the MS for identifying the flow request; receiving from the RAN information specifying at least granted QoS parameters and the Flow Request Identifier and receiving a flow request confirmation message from the PDSN, the flow request confirmation message also comprising the Flow Request Identifier.

In another aspect thereof this invention provides a method of correlating a service instance for a MS, a RAN and a PDSN connection, comprising receiving at the PDSN a reservation request message from the MS, the reservation request message comprising a request for a certain quality of service and a plurality of traffic filter templates; processing the request for the quality of service and generating therefrom bearer service QoS parameters; sending a request to the RAN to establish a bearer based at least in part on the bearer service QoS parameters, the request to establish a bearer comprising a Connection Identifier and receiving an acknowledgment from the RAN, the acknowledgment comprising at least granted QoS parameters, a Service Reference Identifier (SR_ID) and the Connection Identifier.

In yet another aspect thereof this invention provides a PDSN operable with a MS and a RAN, comprising processing means responsive to receipt of a reservation request message from the MS, the reservation request message comprising a request for a certain quality of service and a plurality of traffic filter templates, for processing the request for the quality of service and generating therefrom bearer service QoS parameters; means for sending a request to the RAN to establish a bearer based at least in part on the bearer service QoS parameters, the request to establish a bearer comprising a Connection Identifier; and means for receiving an acknowledgment from the RAN, the acknowledgment comprising at least granted QoS parameters, a Service Reference Identifier (SR_ID) and the Connection Identifier.

In another aspect thereof this invention provides a computer program product tangibly embodied on a computer readable medium and comprising program instructions the execution of which operate a PDSN with a MS and a RAN, comprising operations of, responsive to receipt of a reservation request message from the MS, the reservation request message comprising a request for a certain quality of service and a plurality of traffic filter templates, processing the request for the quality of service and generating therefrom bearer service QoS parameters; sending a request to the RAN to establish a bearer based at least in part on the bearer service QoS parameters, the request to establish a bearer comprising a Connection Identifier and receiving an acknowledgment from the RAN, the acknowledgment comprising at least granted QoS parameters, a Service Reference Identifier (SR_ID) and the Connection Identifier.

In a still further aspect thereof this invention provides a method to perform a handoff of a MN from a first PDSN associated with a first RN to a second PDSN, associated with a second RN. The method includes sending a handoff request message from the first RN to the second RN and communicating between the second RN to the second PDSN and between the second PDSN and the first PDSN to accomplish the handoff; where QoS information associated with the MN in the first RN is sent to the second PDSN.

In another aspect thereof this invention provides apparatus to perform a hand off of a MN from a first PDSN associated with a first Radio Network (RN) to a second PDSN, associated with a second RN. The apparatus includes means for sending a handoff request message from the first RN to the second RN, and means for communicating between the second RN to the second PDSN and between the second PDSN and the first PDSN to accomplish the handoff; where QoS information associated with the MN in the first RN is sent to the second PDSN.

In a further aspect thereof this invention provides a computer program product tangibly embodied on a computer readable medium and comprising program instructions to perform a handoff of the MN from the first PDSN associated with the first RN to a second PDSN associated with a second RN. The computer program product performs operations of sending a handoff request message from the first RN to the second RN; and communicating between the second RN to the second PDSN and between the second PDSN and the first PDSN to accomplish the handoff; where QoS information associated with the MN in the first RN is sent to the second PDSN.

In a still further aspect thereof this invention provides a Packet Data Serving Node that comprises means for receiving QoS information associated with a Mobile Node in a source Radio Network, means for determining a QoS policy for the Mobile Node based at least in part on the received QoS information; and means for sending the QoS policy to a Mobile Node Handoff target Radio Network, where the Packet Data Serving Node communicates with said target Radio Network through an R-P interface connection.

In yet another aspect thereof this invention provides a Radio Network coupled to a Packet Data Serving Node and comprises means for sending to a target Radio Network QoS information for a Mobile Node when functioning as a source Radio Network in association with a Handoff of the Mobile Node to the target Radio Network; and when functioning as the target Radio Node for sending the QoS information received from a source Radio Network to a target Packet Data Serving Node, and for receiving a QoS policy for the Mobile Node from the target Packet Data Serving Node, where the QoS policy is determined at least in part from the QoS information sent to the target Packet Data Serving Node.

BRIEF DESCRIPTION OF THE DRAWINGS

The foregoing and other aspects of the presently preferred embodiments of this invention are made more evident in the following Detailed Description of the Preferred Embodiments, when read in conjunction with the attached Drawing Figures, wherein.

DETAILED DESCRIPTION OF THE PREFERRED EMBODIMENTS

Figure 4:
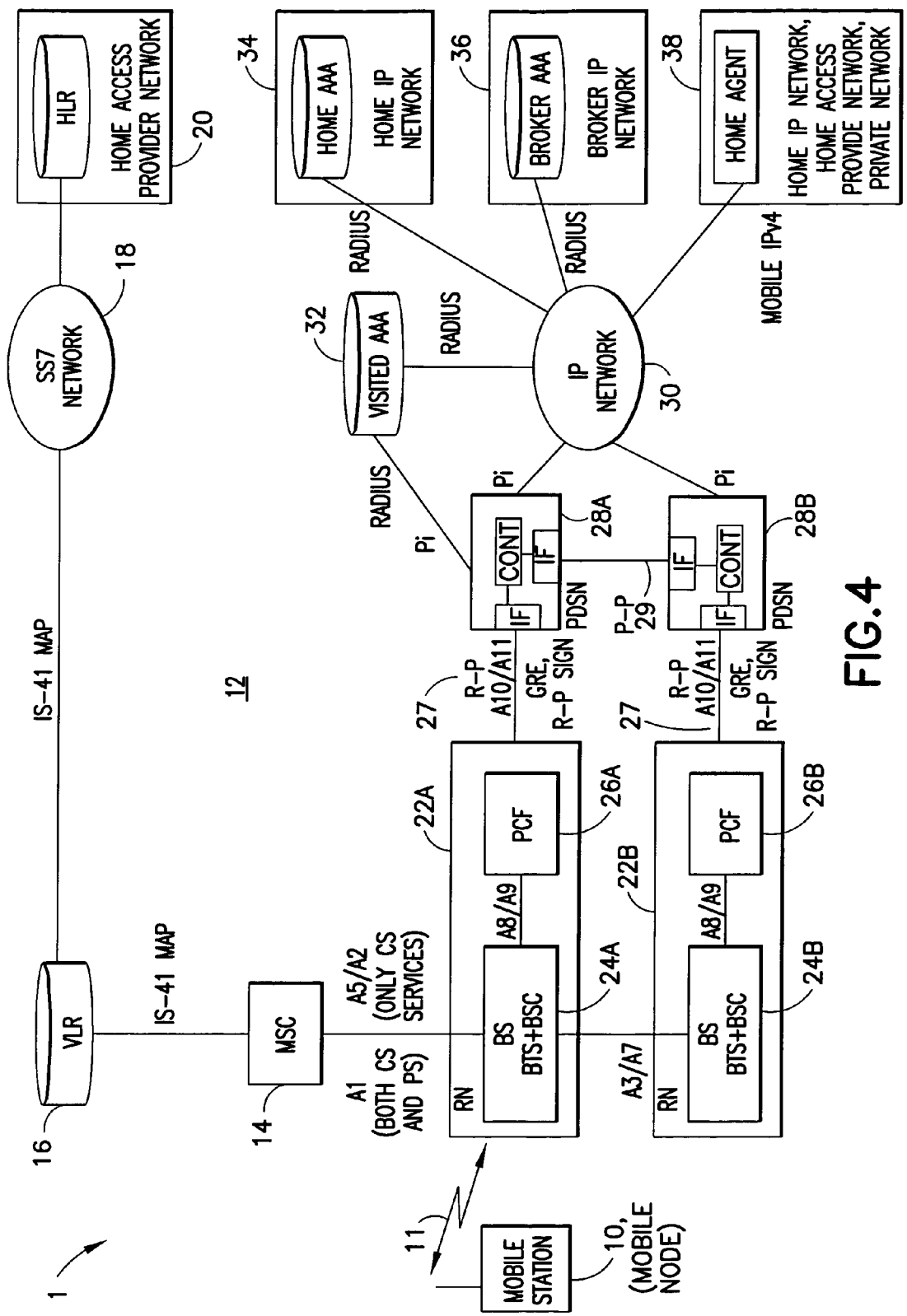
FIG. 4 is a system block diagram of a non-limiting embodiment of a communications system that is suitable for practicing this invention.

By way of introduction, reference is made to FIG. 4 for showing an appropriate technological context within which the embodiments of this invention may be implemented and practiced.

More specifically, FIG. 4 is simplified block diagram of a wireless communication system 1, such as a CDMA 2000-type network, that is suitable for use in practicing the teachings of this invention. A description of FIG. 4 will be provided in order to place this invention into a suitable technological context. However, it should be appreciated that the specific network architecture and topology shown in FIG. 4 is not to be construed in a limiting sense upon this invention, as this invention could be practiced in networks having an architecture and topology that differs from that shown in FIG. 4. Further, the general concepts of this invention may be practiced as well in any access technology for implementing a mobile IP network, and is thus not limited for use only in a CDMA network. As such, while reading the ensuing description it should be noted that while some aspects and nomenclature of the description are specific to a CDMA-type network, the description is not intended to be read in a limiting sense upon the implementation, use and practice of this invention.

The wireless communication system 1 shown in FIG. 4 includes at least one Mobile Node (MN) or MS 10. The MS 10 may be or may include a cellular telephone, or any type of mobile terminal (MT) having wireless communication capabilities including, but not limited to, portable computers, personal data assistants (PDAs), Internet appliances, gaming devices, imaging devices and devices having a combination of these and/or other functionalities. The MS 10 is assumed to be compatible with the physical and higher layer signal formats and protocols used by a network 12, and to be capable of being coupled with the network 12 via a wireless link 11. In the presently preferred embodiments of this invention the wireless link 11 is a radio frequency (RF) link, although in other embodiments the wireless link 11 could be an optical link.

In a conventional sense the network 12 includes a mobile switching center (MSC) 14 coupled through an IS-41 Map interface to a visitor location register (VLR) 16. The VLR 16 in turn is coupled through an IS-41 Map interface to a switching system seven (SS-7) network 18 and thence to a home location register (HLR) 20 that is associated with a home access provider network of the MS 10. The MSC 14 is also coupled through an A1 interface (for circuit switched (CS) and packet switched (PS) traffic) and through an A5/A2 interface (CS services only) to a first radio access network (RAN), also referred to as a radio network (RN) 22A. The first RN 22A includes a base station (BS) 24A that includes a base transceiver station (BTS) and a base station center (BSC) that is coupled through an A8/A9 interface to a Packet Control Function (PCF) 26A. The PCF 26A is coupled via an R-P (PDSN/PCF) interface 27 (also called an A10/A11 interface) to a first packet data serving node (PDSN) 28A and thence to an IP network 30 (via a Pi interface). The PDSN 28A is also shown coupled to a visited access, authorization and accounting (AAA) node 32 via a Pi and a remote authentication dial-in service (RADIUS) interface, that in turn is coupled to the IP network 30 via a RADIUS interface.

Also shown coupled to the IP network 30 via RADIUS interfaces are a Home IP network AAA node 34 and a Broker IP network AAA node 36. A home IP network/home access provider network/private network Home Agent 38 is coupled to the IP network via a Mobile IPv4 interface. In accordance with RFC3220, the Home Agent 38 is a router on the home network of a mobile node (the MS 10 in this description) that tunnels datagrams for delivery to the mobile node when it is away from home, and that maintains current location information for the mobile node.

Also shown in FIG. 4 there may be a second RN 22B that is coupled to the first RN 22A via an A3/A7 interface. The second RN 22A includes a BS 24B and a PCF 26B and is coupled to a second PDSN 28B. The PDSN 28A and the PDSN 28B are coupled together through a P-P interface 29 (PDSN to PDSN interface, defined in IS835C ).

Embodiments of this invention provide a request identification-based approach to correlate different procedures so that the MS 10, RAN 22 and PDSN 28 each have knowledge of which request is associated with which service instance.

Figure 1A:
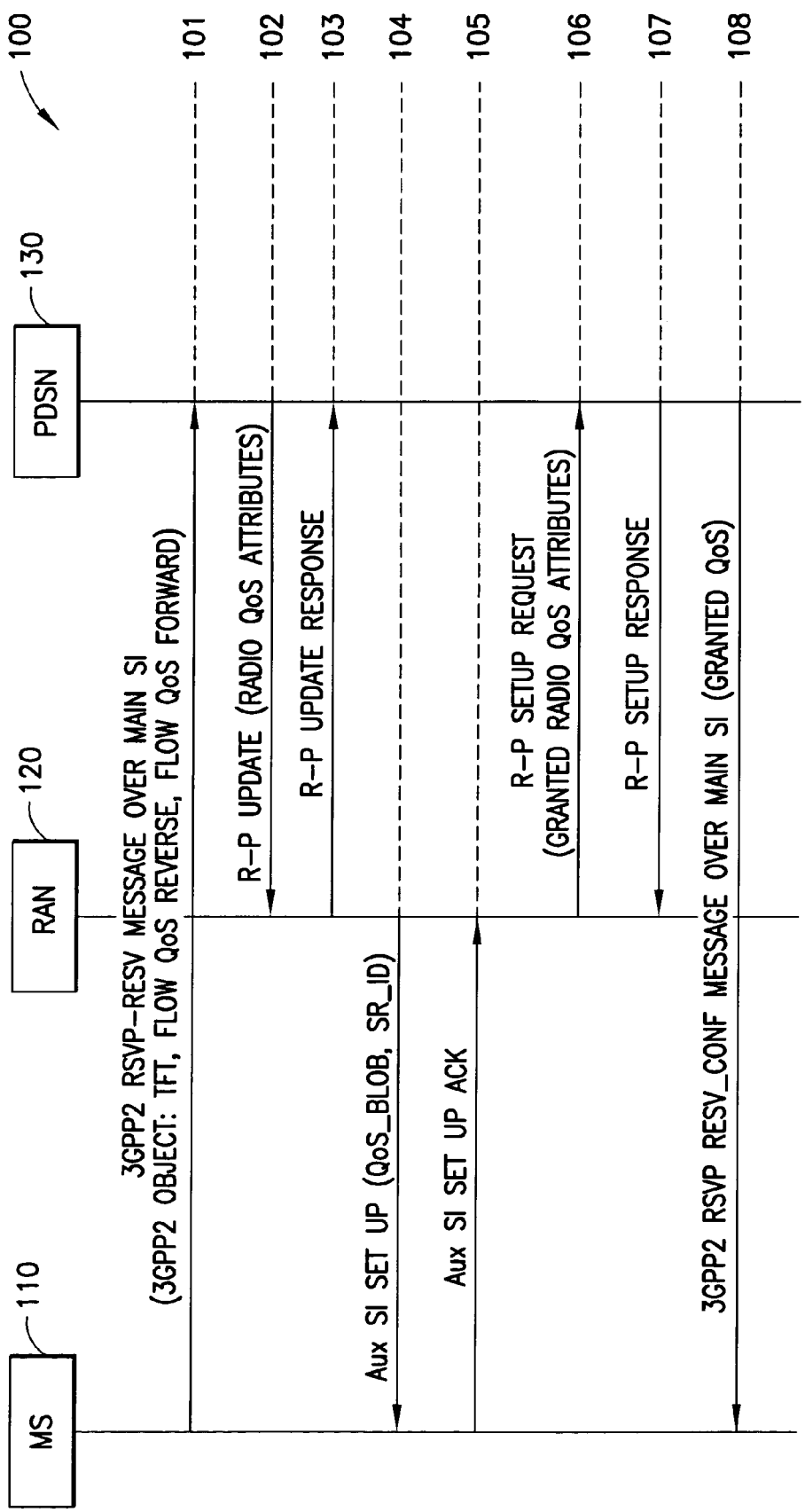
FIG. 1A is a session diagram showing a conventional QoS negotiation procedure in a cdma2000 network.
Figure 1B:
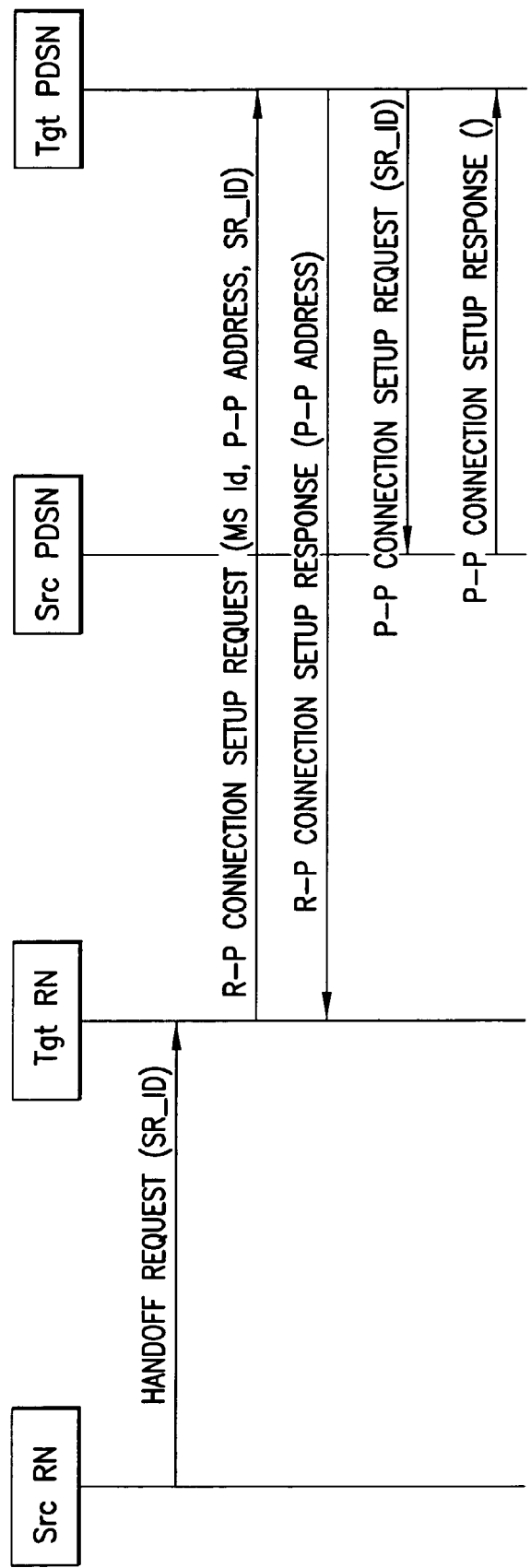
FIG. 1B is a message flow diagram showing a conventional Inter-PDSN Fast Handoff procedure.

It is noted that a possible solution to the problems discussed above would be to enable the MS to signal another RESV message to the PDSN after step 108 in FIG. 1. This additional RESV message should contain at least the TFTs and the assigned SR_ID. However, this approach would require the PDSN to send a RESV_CONF message as the response to the RESV message. As can be appreciated, this approach is not preferred, as it generates additional delay and consumes additional bandwidth.

Figure 2:
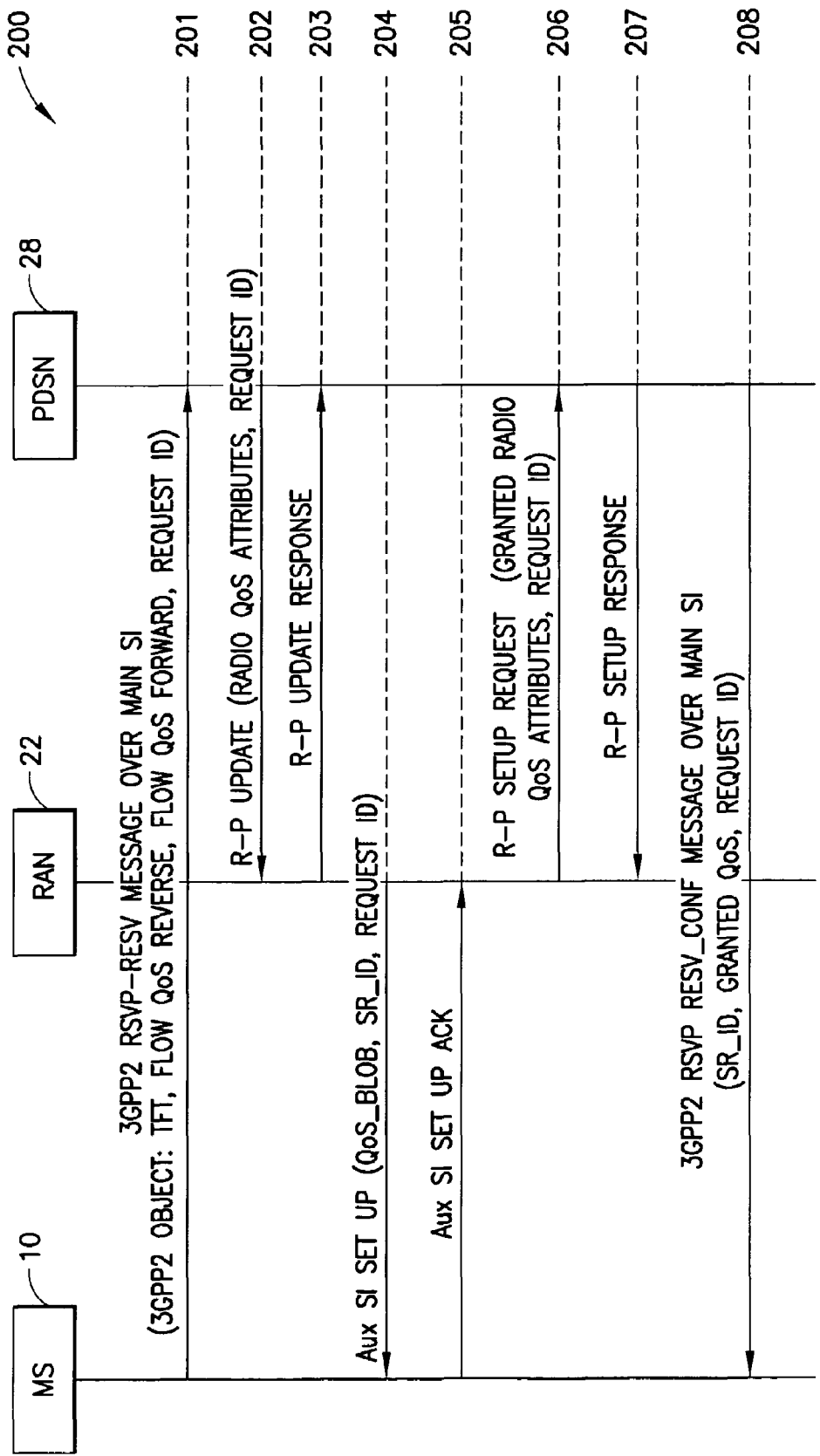
FIG. 2 is a message flow diagram, also referred to as a session diagram, showing the use of a Request ID between the MS, the RAN and the PDSN to correlate multiple procedures.

Multiple presently preferred solutions to the problems discussed above are provided by the embodiments of the invention. A first solution is shown in FIG. 2, and solves both of the above described problems by using a single request identifier (Request Id) in procedures between the MS 10, RAN 22 and PDSN 28. A second solution is described in FIG. 3 and solves the problem related to the case that when the R-P update message is sent by the PDSN 28 to check the resource availability, no SR_ID is assigned. This problem is solved by adding a connection identifier (Connection_ID) over the R-P interface to correlate a service instance with the flow mapping procedure.

Referring first to FIG. 2, there is shown a session diagram 200 illustrative of a solution to both the above described problems by using the single Request Id in all the procedures between the MS 10, RAN 22 and PDSN 28.

At step 201, after exchanging the application level information (not shown in the diagram), the MS 10 sends a 3GPP2-RSVP Resv message to the PDSN 28 containing QoS attributes and traffic filter templates (TFTs) in the 3GPP2 object for both the receiver and the sender. A Request Id is generated and carried in the Resv message. The Request Id is preferably unique for each flow mapping and QoS signaling from the MS 10.

At step 202, after successful authorization of the requested QoS attributes, the PDSN 28 processes the request, and extracts the radio-related QoS parameters and generates the cdma2000 Bearer Service QoS parameters. The PDSN 28 requests the RAN 22 to establish a bearer with the appropriate QoS parameters (link level QoS). The Request Id generated by the MS 10 is also included in the request to the RAN 22.

The RAN 22 acknowledges the session update message at step 203, and at step 204 the RAN 22 uses its resource management function to determine if it can honor the request, and requests establishment of a Service Instance to the MS 10 with the granted link level QoS and assigned SR_ID. Along with the SR_ID, the MS 10 originated Request Id is sent back to MS 10 as well so that MS 10 is informed that the established Service Instance is for the flow whose TFT is carried in the corresponding Resv message.

At step 205, the MS 10 accepts the request.

At step 206, after receiving the SI Setup Acknowledge from the MS 10, the RAN 22 sends an R-P setup message to the PDSN 28. The request message may contain actual granted QoS parameters if the requested QoS parameters could not be honored, along with the Request Id and SR_ID. The Request Id is used by PDSN 28 to correlate the R-P connection with the Resv message.

At step 207, the PDSN 28 acknowledges the R-P setup message. The PDSN 28 also sends the ResvConf message to the MS 10, which carries granted QoS, SR_ID and Request Id (step 208).

Figure 3:
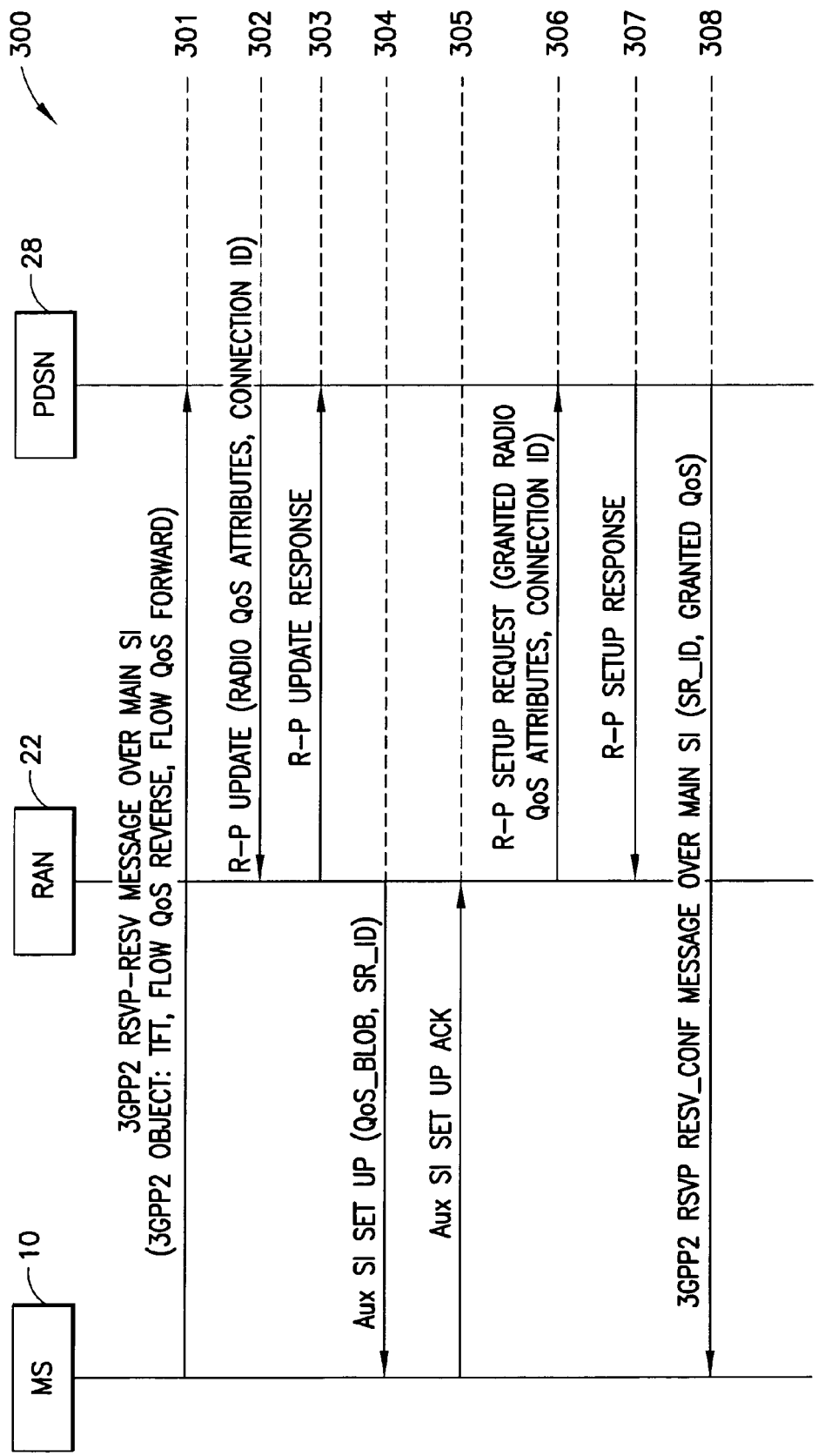
FIG. 3 is a session diagram showing use of a Connection ID over an R-P interface to correlate multiple procedures.

Referring now to FIG. 3, there is shown a session diagram 300 illustrative of a solution to the problem of the MS 10 not having sufficient information to enable it to correlate the higher layer QoS signaling (i.e., the RESV signaling) with the service instance, since the SR_ID is only assigned during the auxiliary service instance setup procedure as shown in step 104 of FIG. 1. FIG. 3 is illustrative of a solution that uses a Connection ID over the R-P interface 27 to correlate multiple procedures between the MS 10, RAN 22 and PDSN 28.

In step 301, after exchanging the application level information (not shown in the diagram), the MS 10 sends a 3GPP2-RSVP Resv message to the PDSN 28 containing QoS attributes and traffic filter templates (TFTs) in the 3GPP2 object for both the receiver and the sender.

At step 302, after successful authorization of the requested QoS attributes, the PDSN 28 processes the request, and extracts the radio related QoS parameters and generates the cdma2000 Bearer Service QoS parameters. The PDSN 28 requests the RAN 22 to establish a bearer with the appropriate QoS parameters (link level QoS). A Connection Id is generated and carried in the R-P update message. The Connection Id is preferably unique for each service instance.

At step 303, the RAN 22 acknowledges the session update message and at step 304 the RAN 22 uses its resource management function to determine if it can honor the request, and requests establishment of a Service instance to the MS with the granted link level QoS and assigned SR_ID.

The MS 10 accepts the request. (Step 305).

At step 306, after receiving SI Setup Ack from the MS 10, the RAN 22 sends an R-P setup message to the PDSN 28, where the request message may contain actual granted QoS parameters, if the requested QoS parameters could not be honored, along with the SR_ID and Connection Id assigned by PDSN 28 in the R-P update message. The Connection Id is used by PDSN 28 to correlate the R-P setup message with the R-P update message, and to consequently correlate the SR_ID carried in the R-P setup message with the Resv message that triggers the R-P update message.

At step 307 the PDSN 28 acknowledges the R-P setup message and sends the ResvConf message to the MS 10, which carries granted QoS and the correspondent SR_ID at Step 308.

It should be appreciated that an aspect of this invention relates to at least one computer program product that is tangibly embodied on a computer readable medium and that includes program instructions to operate the MN 10 with the PDSN 28 and the RAN 22. The computer program product may be localized within and/or distributed among the MS 10, PDSN 28 and RAN 22 for execution by constituent data processors thereof (e.g., shown as Controllers (Cont) in each PDSN 28 in FIG. 4). The RNs 22 are also assumed to include suitable Controllers and Interfaces for performing operations in accordance with the embodiments of this invention, as is the MS 10.

In one non-limiting embodiment the computer program product comprises program instructions the execution of which operate the MS 10 with the RAN 22 and the PDSN 28 to perform operations of sending a flow request message to the PDSN 28 comprising information specifying a desired QoS for the flow and a Flow Request Identifier generated by the MS 10 for identifying the flow request; receiving from the RAN 22 information specifying at least granted QoS parameters and the Flow Request Identifier; and receiving a flow request confirmation message from the PDSN 28, the flow request confirmation message also comprising the Flow Request Identifier.

In another non-limiting embodiment the computer program product comprises program instructions the execution of which operate the PDSN 28 with the MS 10 and the RAN 22 to perform operations, in response to a receipt of a reservation request message from the MS 10, where the reservation request message comprises a request for a certain quality of service and a plurality of traffic filter templates, processing the request for the quality of service and generating therefrom bearer service QoS parameters; sending a request to the RAN 22 to establish a bearer based at least in part on the bearer service QoS parameters, the request being one to establish a bearer and comprising a Connection Identifier; and receiving an acknowledgment from the RAN 22, where the acknowledgment comprises at least granted QoS parameters, the SR_ID and the Connection Identifier.

Described now are further embodiments of this invention that address additional ones of the problems described above, and that provide an enhanced inter-PDSN fast handoff technique that provides QoS support during and after handoff.

For the purposes of description of this invention, and not by way of limitation, the first PDSN 28A in FIG. 4 may be considered to be the source PDSN (Src-PDSN), and the second PDSN 28B may be considered to be the target PDSN (Tgt-PDSN), relative to the MN 10. In like manner the associated BSs and PCFs can be assumed to be the source BS 24A and source PCF 26A, and the target BS 24B and target PCF 26B. The Radio Networks 22A and 22B may also be considered as Source and Target RNs, respectively, in accordance with the nomenclature used in FIGS. 5-8.

The further preferred embodiments of this invention provide multiple approaches to enable QoS support over the R-P network 27 between the target RN 22B and target PDSN 28B, as well as the P-P interface 29 between the source PDSN 28A and the target PDSN 28B, during an inter-PDSN 28 handoff.

A first presently preferred further embodiment uses a RN-originated approach where upon receiving a handoff related message from source RN 22A, the target RN 22B sends QoS information of the handoff MN 10 to the target PDSN 28B, which triggers the target PDSN 28B to set up QoS over the P-P interface 29 between the source PDSN 28A and the target PDSN 28B, as well as the R-P connection 27 between the target RN 22B and the target PDSN 28B.

A second presently preferred further embodiment uses a PDSN-originated approach where, triggered by the P-P connection 29 setup, the source PDSN 28A sends the QoS information of the handoff MN 10 to the target PDSN 28B, which triggers the target PDSN 28B to set up QoS over the P-P connection 29 between the source PDSN 28A and the target PDSN 28B, as well as the R-P connection 27 between the target RN 22B and the target PDSN 28B.

In contradistinction to the conventional practice of the Handoff Request message sent from the Src RN to the Tgt RN conveying only the one QoS-related parameter: "Non-Assured Mode Packet Priority", to indicate the priority of a non-assured packet data service, the preferred embodiments of this invention convey QoS-related information from the Src RN 22A, for the embodiments of FIGS. 5 and 6, or from the Src PDSN 28A, for the embodiments of FIGS. 7 and 8, that is sufficient for the Tgt PDSN 28B to derive a QoS policy for the MN 10.

In general, it should be noted that the QoS policy to be enforced by the PDSN (or PCF) can to some extent be dependent on the service provider. However, as a general rule the more QoS information that is provided the more accurate will be the QoS policy that is derived therefrom. As non-limiting examples, the QoS information sent from the Src RN 22A or from the Src PDSN 28A, in accordance with the embodiments of this invention, can include one or more of: an average bit rate, which can aid the Tgt PDSN 28B in determining a traffic shaping policy; the traffic class; and/or the delay requirement, the latter two of which can aid the Tgt PDSN 28B in determining a Diffserv Code Point assignment policy. In addition, the priority can be sent as well. Thus, in accordance with the embodiments of this invention a reference to "QoS information" is intended to imply at least one QoS-related parameter that can be used by the Tgt PDSN 28B in establishing a QoS policy for the MN 10.

The two presently preferred enhanced inter-PDSN handoff techniques that provide QoS support during inter-PDSN handoff are now described in further detail with reference to FIGS. 5-8.

RN-Originated Embodiments

Figure 5:
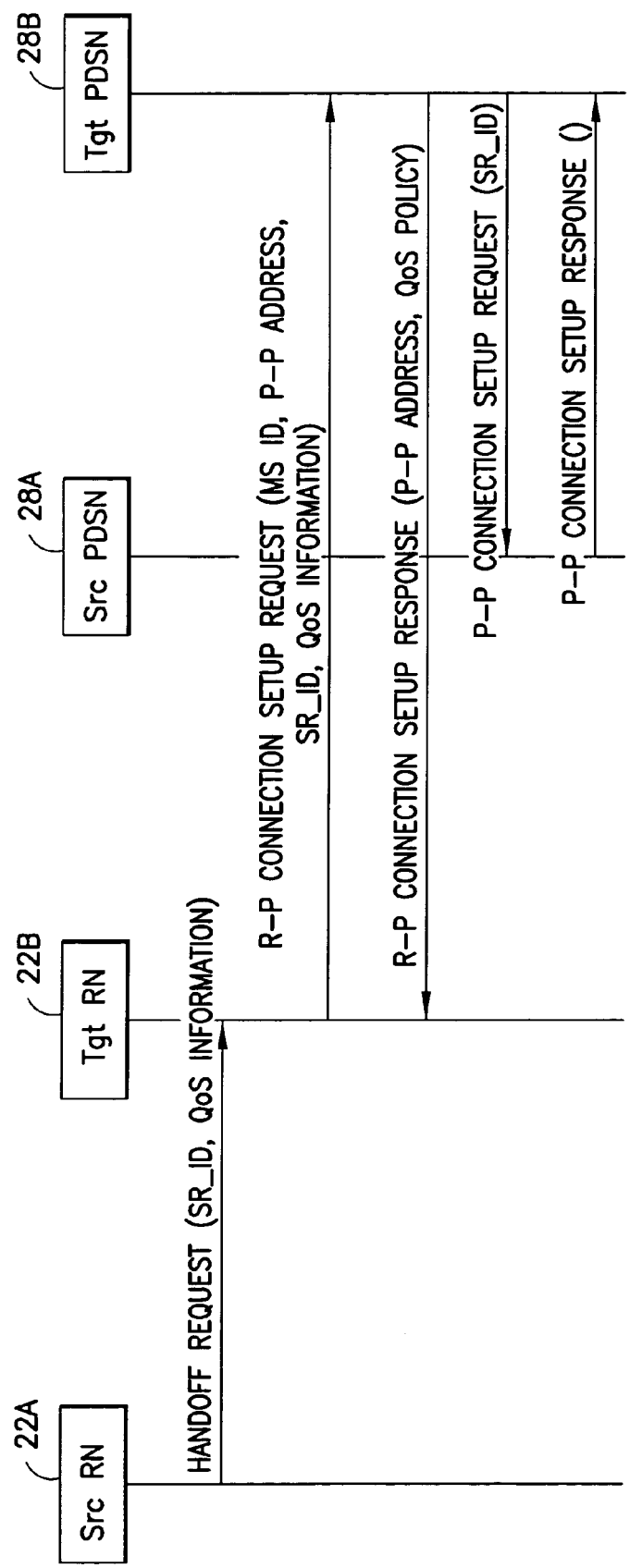
FIG. 5 is a message flow diagram, also referred to as a session diagram, of a first embodiment of an Inter-PDSN fast handoff with QoS support, for a RN originated case.
Figure 6:
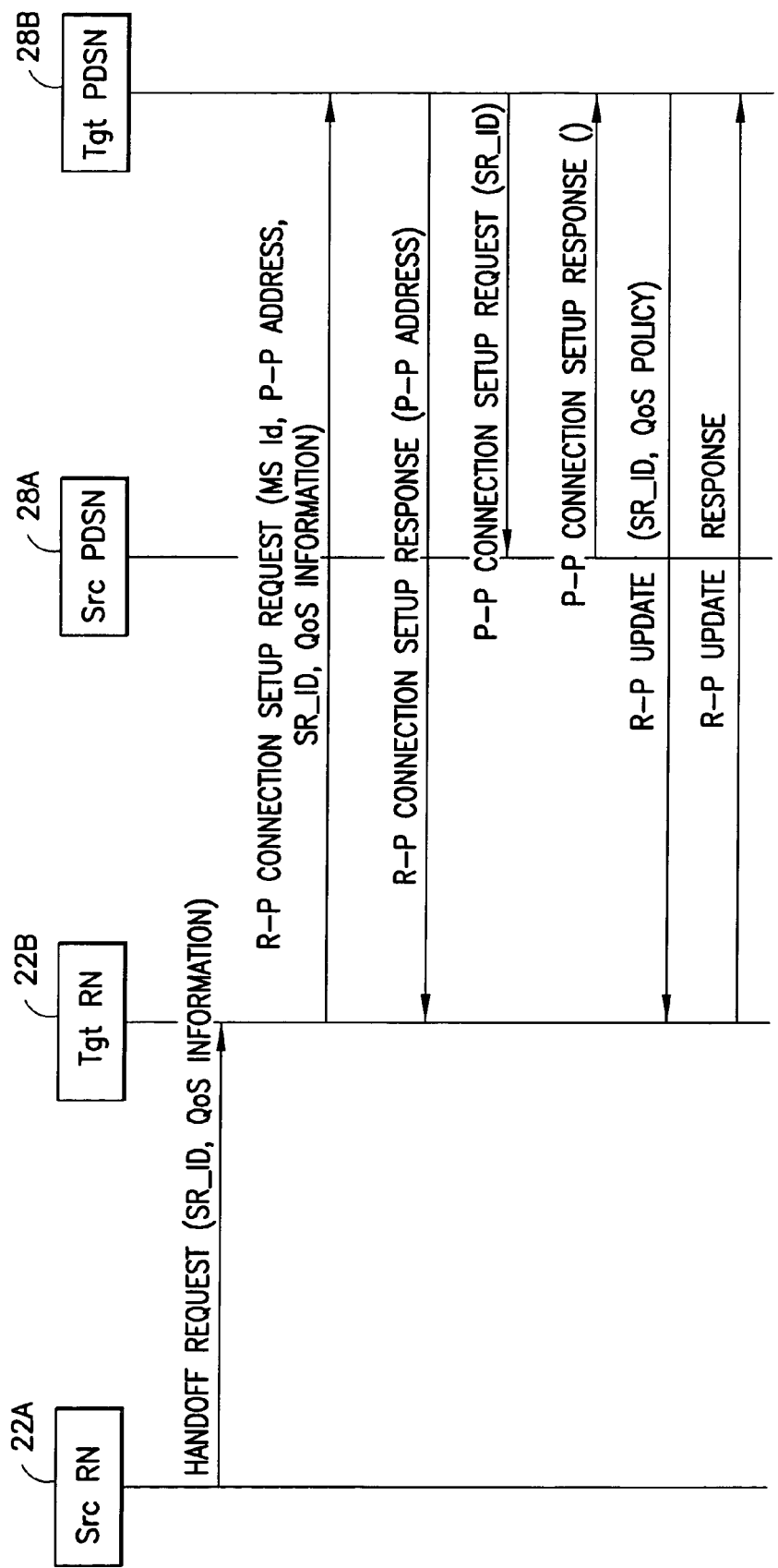
FIG. 6 is a message flow diagram of a second embodiment of an Inter-PDSN fast handoff with QoS support, for a RN originated case.

Assuming that the QoS requirement or QoS provision policy (generally referred to as QoS information in the following description) of the service instance is maintained by the Src RN 22A, and referring to FIG. 5, when handoff is initiated the Src RN 22A transfers the QoS information to the Tgt RN 22B in a Handoff Request message (along with a Service Request Identification (SR_ID) and any other relevant information). The Tgt RN 22B then processes and modifies, if necessary, the received QoS information and then forwards it to the Tgt PDSN 28B in a R-P Connection Setup Request. The Tgt PDSN 28B generates its own QoS policy based on the QoS information sent from Tgt RN 22B, and possibly also other policies. The Tgt PDSN 28B may also optionally push the QoS policy to the Tgt RN 22B for use in providing the QoS support over the R-P network 27 for reverse direction traffic. It is noted that the QoS policy can be carried in the R-P connection setup response message along with the P-P Address, as shown in FIG. 5, or in a separate policy configuration or update message as shown in FIG. 6. FIG. 6 shows a non-limiting example of the QoS information being carried in a R-P Update message sent from the Tgt PDSN 28B to the Tgt RN 22B. Note that in the embodiment of FIG. 6 the P-P connection setup and R-P connection update procedures may be performed in parallel.

It should be noted that when the Src RN 22A transfers the QoS information to the Tgt RN 22B in the Handoff Request message, the Handoff Request message may actually be sent via another network element, such as through the MSC 14.

PDSN-Originated Embodiments

Figure 7:
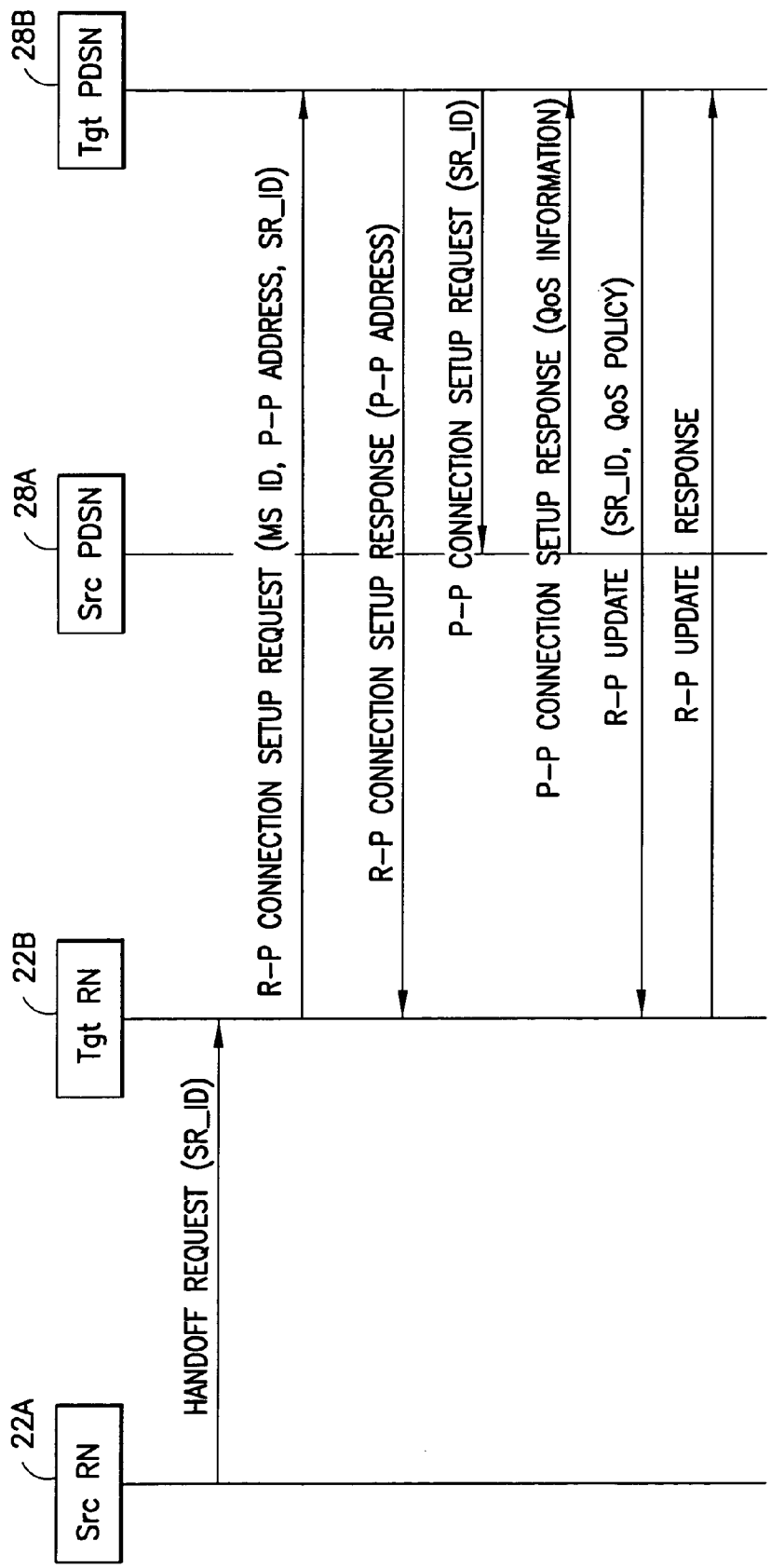
FIG. 7 is a message flow diagram of a first embodiment of an Inter-PDSN fast handoff with QoS support, for a PDSN originated case.
Figure 8:
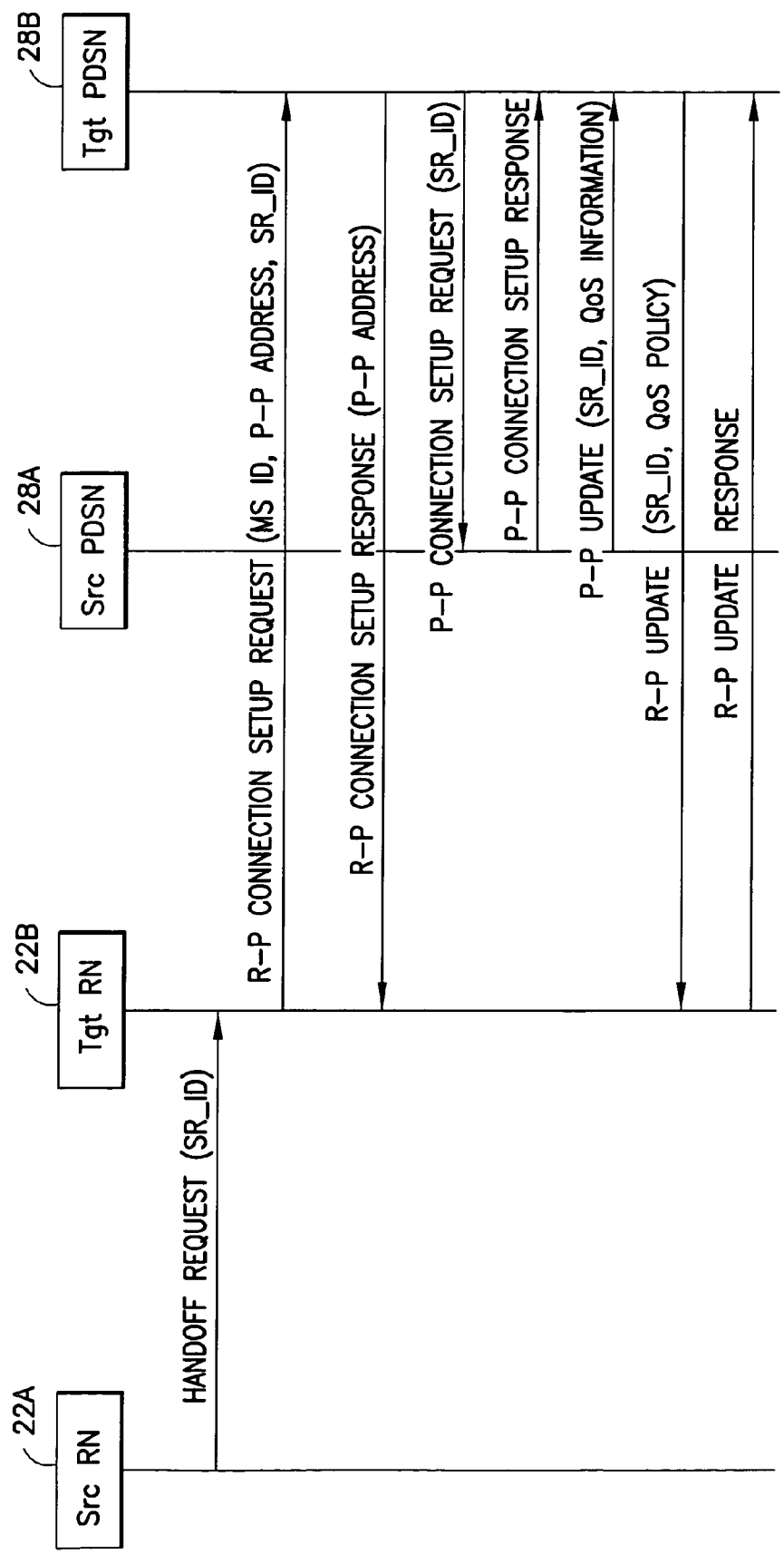
FIG. 8 is a message flow diagram of a first embodiment of an Inter-PDSN fast handoff with QoS support, for a PDSN originated case.

In accordance with the second preferred embodiment of this invention, the source PDSN 28A pushes the QoS information for the service instance to the target PDSN 28B. In this case, and as is illustrated in FIG. 7, the trigger event to initiate sending the QoS information is the P-P Connection Setup Request sent from the source PDSN 28A. The QoS information can be carried within the P-P Connection Setup Response message as shown in FIG. 7, or in a separate policy configuration or update message as shown in FIG. 8 (in this non-limiting example the QoS information is carried in a P-P Update message sent from the Src PDSN 28A). The Tgt PDSN 28B may optionally push the QoS policy to the Tgt RN 22B in a policy configuration or update message. Note that in the example shown in FIG. 8 the P-P connection update and R-P connection update procedures can be performed in parallel.

In other embodiments of this invention a message other than a P-P Connection Setup can be used as a trigger, and correspondingly another message or messages can be used to convey the QoS information.

It should be clear that one, non-limiting advantage that is realized by the use of the embodiments of this invention is that it enables the QoS support over the P-P interface 29 between the source PDSN 28A and the target PDSN 28B, as well as the R-P connection 27 between the target RN 22B and the target PDSN 28B. Without the use of the embodiments of this invention the traffic from/to the handoff MN 10 over the network/links discussed above may only experience best effort services, as opposed to the QoS required or requested by the MN 10. The embodiments of this invention thus provide an enhancement to inter-PDSN handoff performance.

It should be further appreciated that an aspect of this invention relates to at least one computer program product that is tangibly embodied on a computer readable medium and that includes program instructions to perform the hand off of the MN 10 from the first (Src) PDSN 28A associated with the first (Src) RN 22A to the second (Tgt) PDSN 28B associated with the second (Tgt) RN 22B. The computer program product, which may be distributed between the source and target RNs and PDSNs for execution by constituent data processors thereof (shown as Controllers (Cont) in each PDSN 28 in FIG. 4), performs operations that include sending a hand off request message from the first RN 22A to the second RN 22B; and communicating between the second RN 22B to the second PDSN 28B, and between the second PDSN 28B and the first PDSN 28A, to accomplish the handoff. In accordance with the preferred embodiments of this invention QoS information associated with the MN 10 in the first RN 22A is sent to the second PDSN 28B. The PDSNs 28 also include suitable R-P and P-P interfaces (IFs) shown in FIG. 4 for sending and receiving the information in accordance with this invention. The RNs 22 are also assumed to include suitable Controllers and Interfaces for performing operations in accordance with the embodiments of this invention.

Applicant hereby defines "plurality" to mean one or more.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent message types and signaling formats may be attempted by those skilled in the art. That is, while the embodiments of this invention have been defined in the context of a cdma2000 system, and uses certain message types and message names associated with a cdma2000 system, in other embodiments other message types and message names may be employed. However, all such and similar modifications of the teachings of this invention will still fall within the scope of the embodiments of this invention.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A method comprising:

receiving from a mobile station a reservation message, said reservation message comprising a request for a plurality of quality of service attributes and a plurality of traffic filter templates;

receiving a request identifier generated by said mobile station uniquely identifying the request from at least two requests from said mobile station, where each request is uniquely identified by a different request identifier;

processing the requested plurality of quality of service attributes;

extracting from said requested plurality of quality of service attributes at least one attribute related to radio access;
generating a plurality of bearer service parameters based on the at least one attribute related to radio access;
requesting a radio access network to establish a bearer based on said plurality of bearer service parameters;
providing said request identifier to the radio access network;
receiving acknowledgment from the radio access network;
receiving a setup message comprising a plurality of quality of service attributes granted by the radio access network and a service reference identifier;
correlating a packet data serving node connection with said radio access network; and
sending a confirmation message to said mobile station, said confirmation message comprising said plurality of quality of service attributes granted by the radio access network, said service reference identifier and said request identifier.

2. A method comprising:
receiving from a mobile station a reservation message, said reservation message comprising a request for a plurality of quality of service attributes and a plurality of traffic filter templates;
processing the requested plurality of quality of service attributes;
extracting from said requested plurality of service attributes at least one attribute related to radio access;
generating a plurality of bearer service parameters based on the at least one attribute related to radio access;
requesting a radio access network to establish a bearer based on said plurality of bearer service parameters;
providing a connection identifier for uniquely identifying a service instance from at least two service instances for said mobile station, where each service instances is uniquely identified by a different connection identifier;
receiving acknowledgment from the radio access network having the connection identifier;
receiving a setup message comprising a plurality of quality of service attributes granted by the radio access network and a service reference identifier;
correlating a packet data serving node connection with said radio access network; and
sending a confirmation message to said mobile station, said confirmation message comprising said plurality of quality of service attributes granted by the radio access network, and said service reference identifier.

3. A method comprising:
receiving a reservation request message at a packet data serving node from a mobile station comprising a request for a plurality of quality of service attributes and a request identifier generated by the mobile station uniquely identifying the request from at least two requests from said mobile station, where each request is uniquely identified by a different request identifier;
processing the requested plurality of quality of service attributes and generating therefrom a plurality of bearer service quality of service parameters;
sending a request to a radio access network to establish a bearer based at least in part on said plurality of bearer service quality of service parameters, said request to establish a bearer comprising the request identifier;
sending a service instance setup message to the mobile station from the radio access network, the service instance setup message comprising link-level quality of service parameters granted by the radio access network and the request identifier;
sending a radio access network-packet data serving node connection setup request message from the radio access network to the packet data serving node, the setup request message comprising the request identifier;
correlating at the packet data serving node the radio access network-packet data serving node connection with the request identifier received from the mobile station in the reservation request message; and
sending a reservation confirmation message to the mobile station, the reservation confirmation message comprising the request identifier.

4. A mobile station comprising:
means for sending a flow request message to a packet data serving node comprising a flow request, information specifying a desired quality of service for the flow and a flow request identifier generated by the mobile station for identifying the flow request from at least two requests from said mobile station, where each request is uniquely identified by a different request identifier;
means for receiving from the radio access network information specifying at least granted quality of service parameters and the flow request identifier, for further receiving a flow request confirmation message from the packet data serving node, the flow request confirmation message also comprising the flow request identifier and for further receiving an assigned service reference identifier; and
means for correlating the flow request identifier with the assigned service reference identifier.

5. A mobile station as in claim 4, where the flow request message further comprises traffic filter templates.

6. A method comprising:
sending a flow request message to a packet data serving node comprising a flow request, information specifying a desired quality of service for the flow and a flow request identifier generated by a mobile station for identifying the flow request from at least two flow requests from said mobile station, where each flow request is uniquely identified by a different flow request identifier;
receiving from a radio access network information specifying at least granted quality of service parameters, the flow request identifier, and an assigned service reference identifier; and
receiving a flow request confirmation message from the packet data serving node, the flow request confirmation message also comprising the flow request identifier; and
correlating the flow request identifier with the assigned service reference identifier.

7. A method as in claim 6, where sending also sends traffic filter templates.

8. A computer readable medium encoded with a computer program comprising program instructions the execution of which operate a mobile station with a radio access network and a packet data serving node, comprising operations of:
sending a flow request message to the packet data serving node comprising a flow request, information specifying a desired quality of service for the flow and a flow request identifier generated by the mobile station for identifying the flow request from at least two flow requests from said mobile station, where each flow request is uniquely identified by a different flow request identifier;

receiving from the radio access network an assigned service reference identifier, information specifying at least granted quality of service parameters and the flow request identifier;

receiving a flow request confirmation message from the packet data serving node, the flow request confirmation message also comprising the flow request identifier; and correlating the flow request identifier with the assigned service reference identifier.

9. A computer readable medium as in claim 8, where the sending operation also sends traffic filter templates.

10. A method comprising:

receiving at a packet data serving node a reservation request message from a mobile station, said reservation request message comprising a request for a certain quality of service and a plurality of traffic filter templates;

processing the request for the quality of service and generating therefrom bearer service quality of service parameters;

sending a request to a radio access network to establish a bearer based at least in part on said bearer service quality of service parameters, said request to establish a bearer comprising a connection identifier for uniquely identifying a service instance from at least two service instances for said mobile station, where each service instances is uniquely identified by a different connection identifier;

receiving an acknowledgment from the radio access network, the acknowledgment comprising at least granted quality of service parameters, a service reference identifier and the connection identifier; and correlating the connection identifier received from the radio access network with an radio access network-packet data serving node update message sent to the radio access network that comprises the request to establish the bearer.

11. A packet data serving node operable with a mobile station and a radio access network, comprising:

processing means responsive to receipt of a reservation request message from the mobile station, said reservation request message comprising a request for a certain quality of service and a plurality of traffic filter templates, for processing the request for the quality of service and generating therefrom bearer service quality of service parameters;

means for sending a request to the radio access network to establish a bearer based at least in part on said bearer service quality of service parameters, said request to establish a bearer comprising a connection identifier for uniquely identifying a service instance from at least two service instances for said mobile station, where each service instances is uniquely identified by a different connection identifier; and means for receiving an acknowledgment from the radio access network, the acknowledgment comprising at least granted quality of service parameters, a service reference identifier and the connection identifier; and means for correlating the connection identifier received from the radio access network with an radio access network-packet data serving node update message sent to the radio access network that comprises the request to establish the bearer.

12. A computer readable medium encoded with a computer program comprising program instructions the execution of which operate a packet data serving node with a mobile station and a radio access network, comprising operations of:

responsive to receipt of a reservation request message from the mobile station, said reservation request message comprising a request for a certain quality of service and a plurality of traffic filter templates, processing the request for the quality of service and generating therefrom bearer service quality of service parameters;

sending a request to the radio access network to establish a bearer based at least in part on said bearer service quality of service parameters, said request to establish a bearer comprising a connection identifier for uniquely identifying a service instance from at least two service instances for said mobile station, where each service instances is uniquely identified by a different connection identifier;

receiving an acknowledgment from the radio access network, the acknowledgment comprising at least granted quality of service parameters, a service reference identifier and the connection identifier; and correlating the connection identifier received from the radio access network with an radio access network-packet data serving node update message sent to the radio access network that comprises the request to establish the bearer.

13. A method comprising:

sending a flow request message to a packet data serving node comprising information specifying a desired quality of service for the flow and a flow request identifier generated by a mobile station for identifying the flow request from at least two flow requests from said mobile station, where each flow request is uniquely identified by a different flow request identifier;

receiving from a radio access network an assigned service reference identifier, information specifying at least granted quality of service parameters and the flow request identifier;

receiving a flow request confirmation message from the packet data serving node, the flow request confirmation message also comprising the flow request identifier; and correlating the flow request identifier with the assigned service reference identifier.

14. A device, comprising:

a transceiver for bidirectional radio communication with a wireless network; and circuitry configured to send a flow request message to the wireless network comprising a flow request, information specifying a desired quality of service for the flow and a request identifier generated by the device for identifying the flow request from at least two flow requests from a mobile station, where each flow request is uniquely identified by a different flow request identifier, said circuitry further configured to receive information from the wireless network that specifies at least granted quality of service parameters, the information comprising the request identifier, and to further receive a flow request confirmation message that also comprises the request identifier, and where said circuitry is further configured to receive an assigned service reference identifier and to correlate the service reference identifier with the request identifier.

15. A device as in claim 14, where the flow request message further comprises traffic filter templates.

* * * * *